W. H. FOTHERGILL.
STUD PIN AND SEAT THERFOR.
APPLICATION FILED JULY 12, 1907.
909,575.
Patented Jan. 12, 1909.
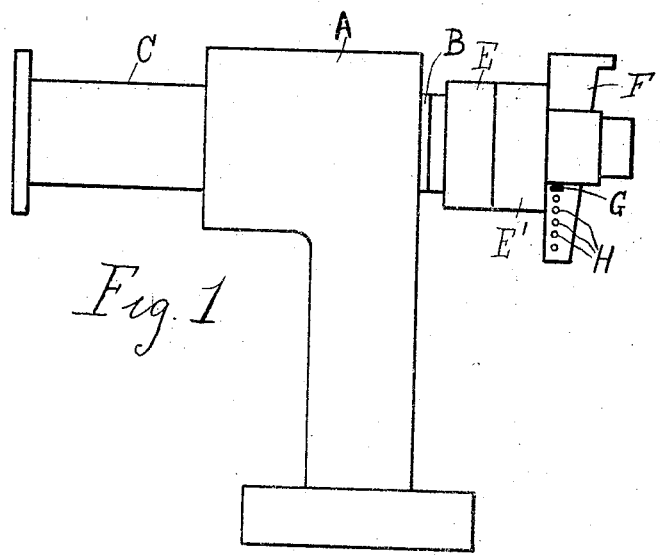
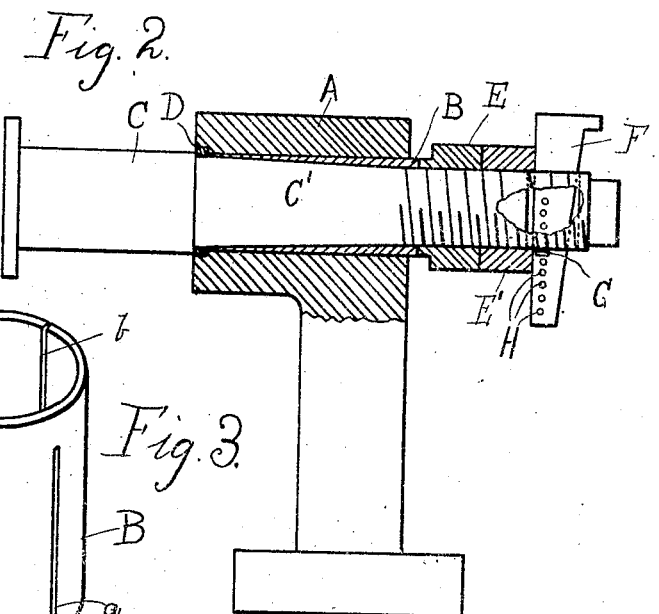
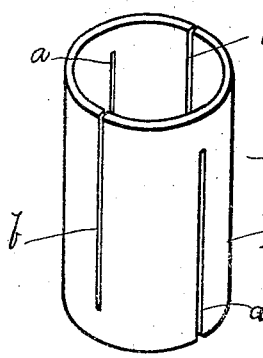
WITNESSES
INVENTOR
William H. Fothergill
BY
ATTORNEY

UNITED STATES PATENT OFFICE.

WILLIAM H. FOTHERGILL, OF PHILADELPHIA, PENNSYLVANIA.

STUD-PIN AND SEAT THEREFOR.

No. 909,575.

Specification of Letters Patent.

Patented Jan. 12, 1909.

Application filed July 12, 1907. Serial No. 383,397.

*To all whom it may concern:*

Be it known that I, WILLIAM H. FOTHERGILL, a citizen of the United States, residing at Philadelphia, in the county of Philadelphia and State of Pennsylvania, have invented a certain new and useful Improvement in Stud-Pins and Seats Therefor, of which the following is a specification.

My invention relates to a new and useful improvement in stud pins and seats therefor, and has for its object to provide an exceedingly simple and effective construction by which the stud pins of all classes of machines, especially heavy machinery, such as locomotives, marine engines and the like may be firmly set in their bearings and so bushed as to reduce the wear thereon, and when it is required to compensate for such wear this is done by setting up the nuts thus overcoming the many disadvantages which have heretofore been experienced in this class of work.

With these ends in view, this invention consists in the details of construction and combination of elements hereinafter set forth and then specifically designated by the claim.

In order that those skilled in the art to which this invention appertains may understand how to make and use the same I will describe its construction in detail, referring by letter to the accompanying drawing forming a part of this specification, in which—

Figure 1 is a side elevation of a locomotive rocker bearing showing my improved stud bearings set therein. Fig. 2, a section of the upper portion of the bearing and split bushing, the stud pin being left in elevation with the exception of a small part thereof which is broken away to clearly show the arrangement of the wedge key therein, and Fig. 3, a perspective of the split bushing.

In carrying out my invention as here embodied, A represents the bearing which may be of any design or for any purpose having a straight hole formed therethrough in which is fitted the split bushing B, the latter being tapered as clearly shown in Fig. 2 having the slots $a$ and $b$ formed therein from opposite ends as clearly shown in Fig. 3.

C represents the stud pin which is shouldered and has a tapering shank C', said tapering shank being adapted to fit snugly within the split bushing, the collar D fitting against the shoulder of the stud pin and being set in a recess in the bearing so as to limit the inward movement of the stud pin while the nut E threaded upon the end of the tapered shank is adapted to force the split bushing inward causing it to jam upon the shank and thus firmly hold the latter in place. To prevent the nut E from accidentally backing off a jam nut E' is also threaded upon the shank and as a further precaution to prevent the moving of these nuts a wedge-shaped key F is set in a corresponding slot formed in the end of the shank, and said key is prevented from being accidentally displaced by a cotter pin G being passed through one of the series of holes H formed in said key.

From this description it will be seen that a stud pin may be firmly set in its bearing and yet when it is desired to remove the same this can be readily accomplished by the removal of the key and the nuts after which the shank may be driven out of the bearing, and in locomotives and like work this is of great importance since these stud pins become loose from wear and often break off requiring considerable time and labor to remove the old pin and substitute a new one, and when a pin of ordinary construction commences to wear in its bearing the bearing must be reamed out for the setting of a new pin whereas by my improvement any wear which may take place is readily compensated for by forcing the split bushing through the nut and bearing, and on account of the shank being tapered this inward forcing of the bushing will cause it to jam against the walls of the hole as well as against the shank, thus securely holding the pin in place.

Of course I do not wish to be limited to the exact details of construction here shown as these may be varied within reasonable limits without departing from the spirit of my invention.

Having thus fully described my invention, what I claim as new and useful, is—

The herein described combination of a bearing having a straight hole therethrough, a split bushing cylindrical upon its outer surface and tapering upon its inner surface, a stud pin having a tapered shank formed therewith, said shank adapted to fit within said bushing, a collar fitted upon the shank and bearing against the shoulder of the stud pin, nuts run upon the threaded end of the shank and adapted to jam the split bushing in the bearing and against the tapered shank, a wedge-shaped key fitted in a slot back of the nuts, said key having a series of holes therein, and a cotter pin adapted to fit within one of said holes for preventing the accidental displacement of the key, as specified.

In testimony whereof, I have hereunto affixed my signature in the presence of two subscribing witnesses.

WILLIAM H. FOTHERGILL.

Witnesses:
JOSEPH V. MONAGHAN,
JNO. W. JENNINGS.